Sept. 17, 1929.  P. T. LINDHARD  1,728,495
CEMENT GRINDING MILL
Filed Nov. 5, 1927
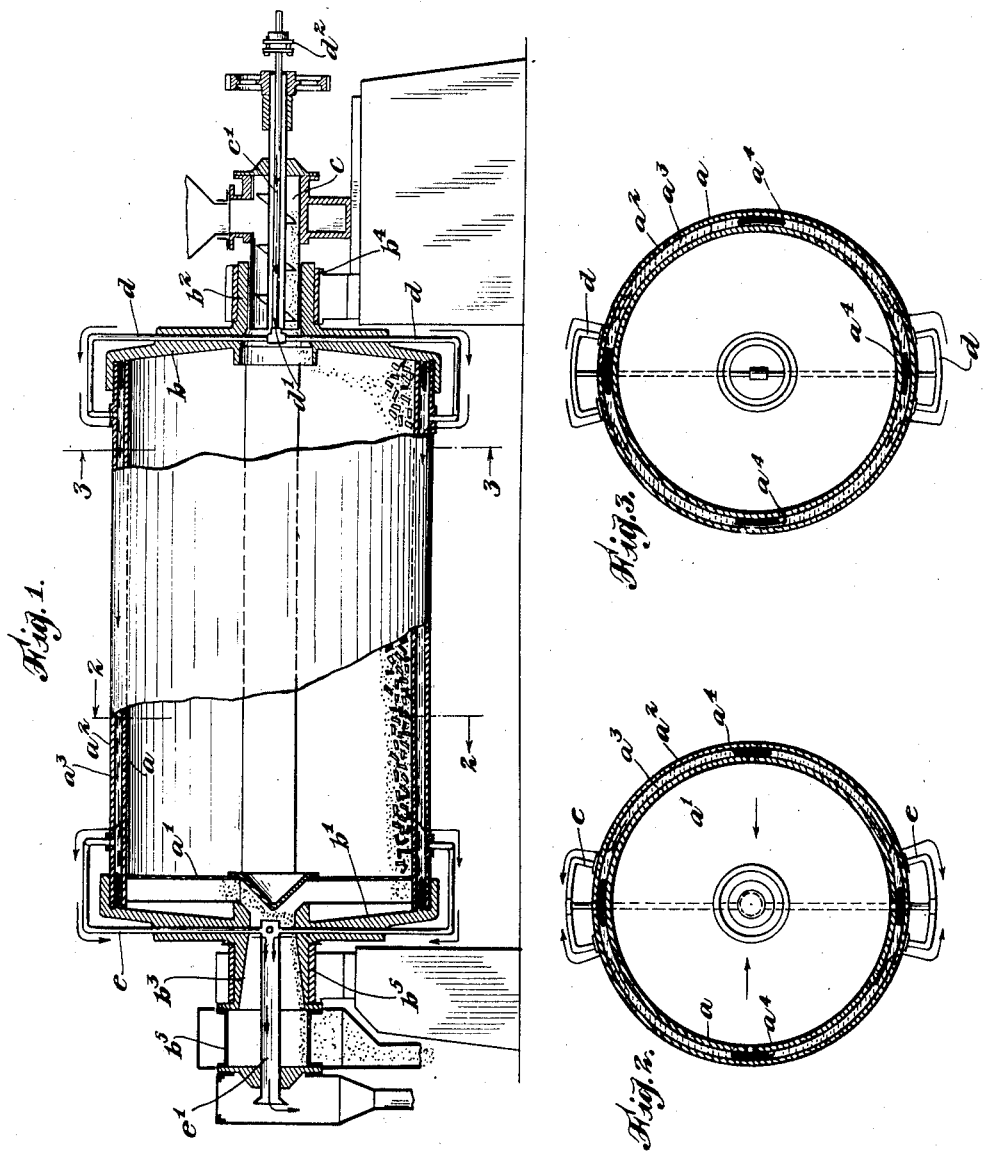
INVENTOR
Poul T. Lindhard
BY
Redding, Greeley, O'Shea & Campbell
ATTORNEYS Patented Sept. 17, 1929

1,728,495

UNITED STATES PATENT OFFICE

POVL T. LINDHARD, OF BROOKLYN, NEW YORK, ASSIGNOR TO F. L. SMIDTH & CO., OF NEW YORK, N. Y., A CORPORATION OF NEW JERSEY

CEMENT-GRINDING MILL

Application filed November 5, 1927. Serial No. 231,343.

In the manufacture of Portland cement with the addition of a small percentage of raw gypsum, it has been found desirable to prevent the raising of the temperature of the cement material, such as is likely to take place in the grinding, above the critical degree, about 240° F., at which the raw gypsum is converted into plaster of Paris, the presence of which in the finished material affects more or less the quality of the cement, particularly as regards the time of setting. It has been proposed heretofore to prevent the overheating of the cement material in various ways, as by the application of water from a perforated pipe to the exterior of the mill in which the grinding of the cement material is carried on, but this is not a practicable method because of the rapid evaporation of the water, by reason of the relatively high temperature of the mill, the creation of a cloud of steam, and the dripping of such water as is not evaporated. It has also been proposed to cool more than ordinarily the clinker, either as it comes from the kiln or after a coarse grinding, to such an extent that the temperature of the material will not be raised during the grinding to the critical degree, but this method of preventing the development of excessive heat involves changes in the ordinary procedure and likewise is not thoroughly practicable.

The object of the present invention is to provide for the water-cooling of the cement material, during the grinding in such manner that the objections above mentioned will be obviated. In accordance with the present invention the grinding mill is provided with a water-jacket and provision is made for the introduction and discharge of water to and from the water space during the progress of the grinding.

The invention will be explained more fully hereinafter with reference to the accompanying drawing in which it is illustrated and in which:

Figure 1 is a view in longitudinal, sectional elevation of a cement grinding mill which embodies the invention.

Figures 2 and 3 are views in transverse section on the planes indicated by the broken lines 2—2 and 3—3 of Figure 1 respectively.

The mill illustrated in the drawing as an embodiment of the invention has the usual cylindrical drum $a$ supported for rotation on a horizontal axis by cylinder heads $b$, $b'$ which have hollow trunnions $b^2$ and $b^3$ respectively mounted in suitable bearings $b^4$ and $b^5$ so that the drum or shell may be rotated upon a horizontal axis. The cement material to be ground is delivered to the mill through the hollow trunnion $b^2$ by a suitable feeding mechanism, indicated generally at $c$, which may be of ordinary construction, except that it has a hollow shaft $c'$. The discharge trunnion $b^3$ may be provided as usual with a screen $b^6$ and adapted as usual to receive the ground material from the drum after it has passed through the usual screen $a'$.

The heads of the cylindrical shell or drum $a$ also support, externally to the shell $a$ and spaced therefrom, a shell $a^2$, a water space $a^3$ being former between the two shells and preferably divided longitudinally by bars $a^4$ to form longitudinal, quadrantal chambers. Supported by the head $b$ are pipes $d$ which communicate respectively and through branches with the quadrantal chambers above mentioned and are connected in the line of the axis of the mill with a feed pipe $d'$, which passes axially through the tubular shaft $c$ and the trunnion $b^2$ and is connected through a suitable stuffing box, as at $d^2$, to the water pipe.

In like manner the several longitudinal quadrantal chambers of the water space are connected by discharge pipes $e$ with the axial outlet pipe $e'$, from which the water, supplied through the inlet pipes $d$ and discharged through the discharge pipes $e$, is permitted to escape. As the cooling water supplied through the pipes $d$, $d'$, circulates through the water space surrounding the drum of the mill, it absorbs heat from the mill and from the grinding bodies and material therein, reducing the temperature of the material to such an extent that it will not be raised above the critical degree by the added heat imparted to the material in the process of grinding. The conversion of the raw gypsum into plaster of Paris is thus prevented.

I claim as my invention:

A mill for grinding cement material, comprising a cylindrical horizontal shell, heads in said shell having hollow trunnions to support the shell and to permit the feeding and discharge of cement material, a second shell supported by said heads and spaced from the first named shell, inlet and discharge pipes carried by the cylinder heads and communicating with the space between the shell, and axially disposed supply and outlet pipes connected to said inlet and discharge pipes, said last mentioned pipes being introduced through the trunnions of the mill respectively.

This specification signed this 2nd day of November, A. D. 1927.

POVL T. LINDHARD.